No. 659,589. Patented Oct. 9, 1900.
R. J. C. MITCHELL.
PNEUMATIC TIRE FOR WHEELS.
(Application filed June 15, 1900.)
(No Model.)
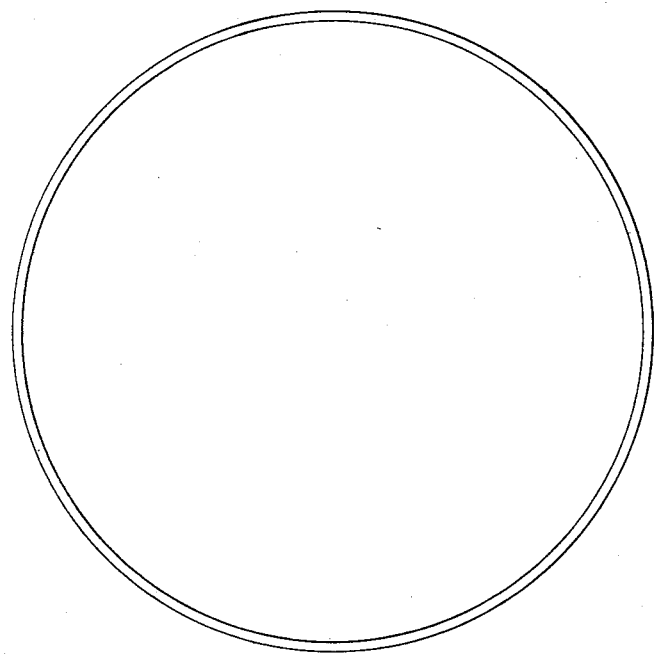
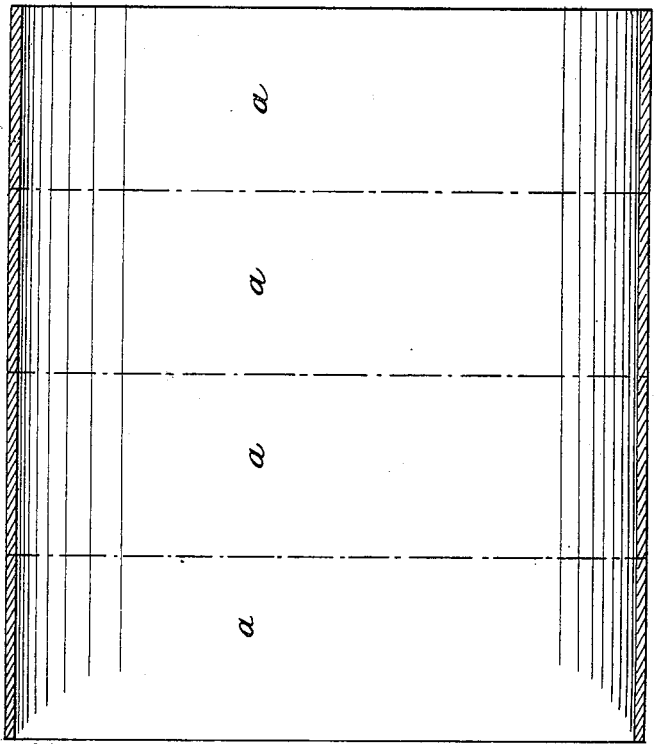
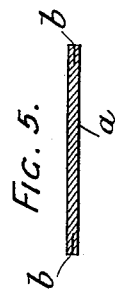
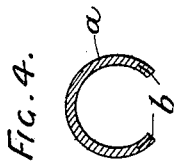
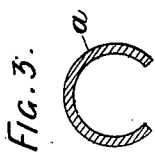
INVENTOR
Robert J.C. Mitchell
BY
ATTORNEYS

UNITED STATES PATENT OFFICE.

ROBERT J. C. MITCHELL, OF WATERFOOT, ENGLAND.

PNEUMATIC TIRE FOR WHEELS.

SPECIFICATION forming part of Letters Patent No. 659,589, dated October 9, 1900.

Application filed June 15, 1900. Serial No. 20,438. (No model.)

*To all whom it may concern:*

Be it known that I, ROBERT JOHN CHADWICK MITCHELL, a subject of the Queen of Great Britain, residing at Waterfoot, near Manchester, in the county of Lancaster, England, have invented new and useful Improvements in or Applicable to Pneumatic Tires for Wheels, of which the following is a specification thereof.

This invention relates to that class of pneumatic tires for the wheels of bicycles and other vehicles which are composed of an inner inflatable annular tube of india-rubber or other air-proof material and an outer removable cover or "protecting-tread," which latter is usually composed of a combination of india-rubber and canvas or other unstretchable woven fabric or material, such removable cover being secured in its place on the metallic rim or felly of the wheel by endless wires.

My improvements relate to the construction of the outer removable cover or tread of such pneumatic tires, the objects of the said invention being to make such covers more durable and less costly than heretofore and to prevent entirely the "side slipping" and puncturing of the tire, to which the ordinary india-rubber surface is liable and which (especially in bicycles) is a frequent cause of accident.

The manner in which my said invention is to be performed or carried into practical effect will be readily understood on reference to the sheet of drawings hereunto annexed and the following explanation thereof.

According to my invention I propose to make such tire covers and treads entirely of a single seamless piece of hardened and milled felt in the following manner: I first manufacture by felting, hardening, and milling wool upon a suitable cylindrical bed or "former" a cylinder of solid felt of the diameter and thickness required for the cover and of any convenient width, as represented in longitudinal section at Figure 1 on the drawings and in transverse section at Fig. 2, and I cut from this cylinder a series of flat endless bands *a* of a sufficient width to form the tire-covers, as indicated by the dotted lines on Fig. 1 and on the general plan described in my Patent No. 647,898, dated April 17, 1900. These flat endless bands of felt I then mold while wet and pliable into an arched or horseshoe form in cross-section, as shown at Fig. 3, so that their edges approach each other or nearly touch, as may be required. The flat felt bands *a* are stretched and molded while wet over suitable molds or formers of the required shape and size, made of wood or other suitable material, the said bands being secured thereto by twine or other similar means to prevent the felt from getting out of shape while drying. When the felt band thus molded is thoroughly dried, it can be removed from the mold or former and submitted to a further process of extra milling, which will cause it to permanently retain its shape.

In some cases it may be found necessary to make the molds or formers in two or more parts to facilitate their removal from the inside of the felt covers when dried and hard; but except for covers for motor-car tires or other very thick strong tires it will not be necessary.

If the felt is hardened and milled to a sufficient degree to resist moisture, the covers may be used without any further preparation, (excepting wiring, as hereinafter described;) but in other cases it may be made waterproof by the application thereto of india-rubber solution or other known water-repellent solution or composition.

To insert the binding-wires, I cut a slit *b* in each solid edge of the hardened and milled felt cover *a* all around, as shown at Fig. 4, and I insert the endless wires therein and fix them in place by stitching through the felt on the outer side of the wire, or on both sides, if preferred, or in some cases where the "milling" is not carried to too great an extent I may dispense with the molding or forming process above described and cut the slits *b* in the solid edges of the endless bands *a* of hardened and milled felt in the flat form, as shown at Fig. 5, and taking an endless wire of smaller circumference or circle than that of the flat band the operator lays one portion of the same in one of the slits *b* and commences to sew it therein. As this operation proceeds the operator will force the edge of the felt from time to time endwise along the wire, slightly compressing and crimping the same by pressure of the fingers, so that the edge *b* of the felt band becomes gradually contracted to a smaller circumference or circle than the central portion thereof until eventually the edge of the band becomes so contracted that by the time the stitching is completed all around the whole of the endless wire will be covered in and the edge of the felt contracted to such an extent that when both edges have been thus wired the flat band will assume the horseshoe form shown at Fig. 4.

These improved seamless or jointless outer covers or treads for pneumatic tires made from a single piece of solid hardened and milled felt will be found to be quite as resilient as the ordinary covers, more durable and less costly, and will entirely prevent the tendency to side slipping and puncturing to which the ordinary tire-covers as now made are so liable.

I claim as my invention—

1. As a new product or manufacture, a seamless and jointless removable outer cover or "tread" for pneumatic tires constructed from a single piece of hardened and milled felt of horseshoe cross-section, substantially as described.

2. As a new product or manufacture, a seamless or jointless removable outer cover or tread for pneumatic tires constructed of an endless ring of hardened and milled felt of horseshoe cross-section and with slit edges containing binding-wires, substantially as described.

In testimony whereof I have signed my name to this specification in the presence of two subscribing witnesses.

ROBERT J. C. MITCHELL.

Witnesses:
JNO. HUGHES,
J. ERNEST HUGHES.